US009527182B2

(12) United States Patent
Eickens et al.

(10) Patent No.: US 9,527,182 B2
(45) Date of Patent: Dec. 27, 2016

(54) DEVICE FOR THE EXTRACTION, PARALLEL TO THE PROCESS, OF PROCESSING PRODUCTS ARISING DURING THE PROCESSING OF A WORKPIECE

(75) Inventors: Sebastian Eickens, Kevelaer (DE); Markus Jansen, Viersen (DE)

(73) Assignee: KRAUSSMAFFEI TECHNOLOGIES GMBH, München (DE)

( * ) Notice: Subject to any disclaimer, the term of this patent is extended or adjusted under 35 U.S.C. 154(b) by 161 days.

(21) Appl. No.: 14/001,623

(22) PCT Filed: Feb. 22, 2012

(86) PCT No.: PCT/EP2012/052965
§ 371 (c)(1),
(2), (4) Date: Aug. 26, 2013

(87) PCT Pub. No.: WO2012/119852
PCT Pub. Date: Sep. 13, 2012

(65) Prior Publication Data
US 2013/0330144 A1 Dec. 12, 2013

(30) Foreign Application Priority Data
Mar. 4, 2011 (DE) .......................... 10 2011 013 111

(51) Int. Cl.
*B23Q 11/00* (2006.01)
*B08B 15/04* (2006.01)
(Continued)

(52) U.S. Cl.
CPC ........... *B23Q 11/0042* (2013.01); *B08B 15/04* (2013.01); *B23Q 11/0046* (2013.01); *B24B 55/06* (2013.01);
(Continued)

(58) Field of Classification Search
CPC ................... Y10T 409/304088; Y10T 408/50; B23B 2270/30; B23B 2260/058; B23Q 11/0046; B23Q 11/0071
See application file for complete search history.

(56) References Cited

U.S. PATENT DOCUMENTS 3,167,260 A * 1/1965 Gibbons ............ B23Q 11/0046
144/252.1
3,924,696 A * 12/1975 Horlin et al. .................. 175/209
(Continued)

FOREIGN PATENT DOCUMENTS

DE 846 215 8/1952
DE 27 15 378 12/1985
(Continued)

OTHER PUBLICATIONS

DE 3733534 A1 English Translation.*
International Search Report issued by the European Patent Office in International Application PCT/EP2012/052965 on Jul. 10, 2012.

*Primary Examiner* — Daniel Howell
*Assistant Examiner* — Yasir Diab
(74) *Attorney, Agent, or Firm* — Henry M. Feiereisen LLC

(57) ABSTRACT

A device for the extraction of processing products includes a double-walled extraction hood, which has a first inner housing part and a second outer housing part arranged at a distance from the first inner housing part. The two housing parts are arranged coaxial with each other and partially within each other in such a way that an air channel is formed between the two housing parts. The air channel has a front end that can be aligned with the workpiece and a rear end opposite the front end. A flow directed from the front end to the rear end can be created in the air channel. The extraction hood, in particular the inner housing part of the extraction (Continued)

hood, is designed to accommodate at least part of the processing device and can be connected thereto.

26 Claims, 5 Drawing Sheets

(51) Int. Cl.
*B24B 55/06* (2006.01)
*B24B 55/10* (2006.01)

(52) U.S. Cl.
CPC .......... *B24B 55/10* (2013.01); *B23B 2260/058* (2013.01); *B23B 2270/30* (2013.01); *B23Q 11/0071* (2013.01); *Y02P 70/171* (2015.11); *Y10T 408/50* (2015.01); *Y10T 409/304088* (2015.01)

(56) References Cited

U.S. PATENT DOCUMENTS

| | | | | |
|---|---|---|---|---|
| 4,037,982 A | * | 7/1977 | Clement | 408/61 |
| 4,200,417 A | | 4/1980 | Hager et al. | |
| 4,742,855 A | * | 5/1988 | Hartley | 144/252.1 |
| 4,946,322 A | * | 8/1990 | Colligan | 409/137 |
| 4,986,703 A | * | 1/1991 | Hampl et al. | 409/131 |
| 5,474,116 A | | 12/1995 | Shoda | |
| 5,544,986 A | * | 8/1996 | Kudo et al. | 408/67 |
| 5,667,565 A | * | 9/1997 | Gondar | B03C 3/017 15/1.52 |
| 5,772,367 A | * | 6/1998 | Daniel | 408/67 |
| 5,893,687 A | * | 4/1999 | Oketani et al. | 408/97 |
| 6,503,029 B1 | * | 1/2003 | Ende et al. | 408/1 R |
| 7,326,878 B2 | | 2/2008 | Odanaka et al. | |
| 7,455,088 B2 | | 11/2008 | Hirschburger et al. | |
| 7,465,132 B2 | * | 12/2008 | Gipson | 409/137 |
| 2003/0044247 A1 | * | 3/2003 | Wolfe | 408/1 R |
| 2005/0019122 A1 | * | 1/2005 | Kado | B23Q 11/0046 409/137 |
| 2008/0131220 A1 | | 6/2008 | Azema | |
| 2008/0203679 A1 | * | 8/2008 | Hermoso | B23Q 11/0046 279/3 |
| 2009/0320820 A1 | * | 12/2009 | Sinisi | 125/30.01 |

FOREIGN PATENT DOCUMENTS

| | | | |
|---|---|---|---|
| DE | 3733534 A1 | * 4/1989 | B23Q 3/002 |
| DE | 38 24 047 | 1/1990 | |
| DE | 42 25 014 | 2/1994 | |
| DE | 100 03 647 | 5/2001 | |
| DE | 101 52 401 | 1/2004 | |
| DE | 102004016172 | 10/2005 | |
| DE | 102006040784 | 4/2007 | |
| EP | 1306161 A2 | 5/2003 | |
| FR | 2 861 618 | 5/2005 | |
| GB | 1 529 883 | 10/1978 | |
| WO | WO 98/36869 | 8/1998 | |

* cited by examiner

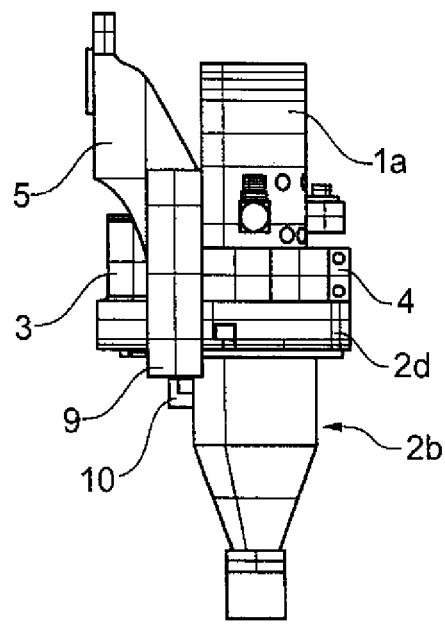
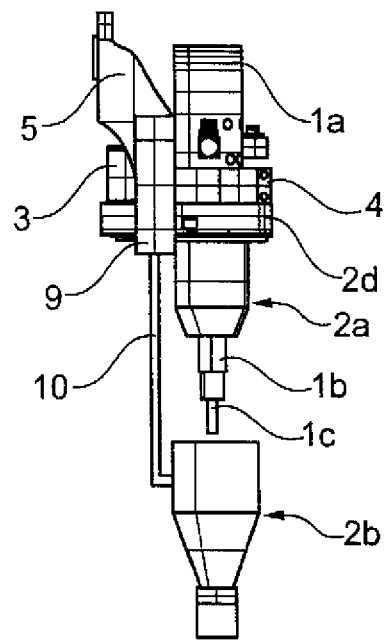
Fig. 4a
Fig. 4b
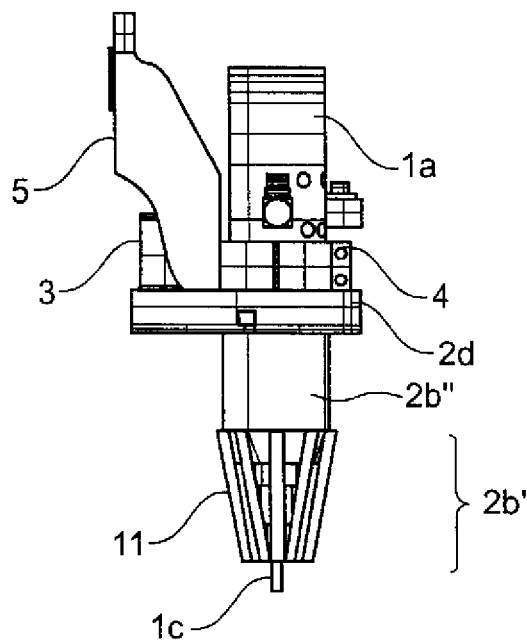
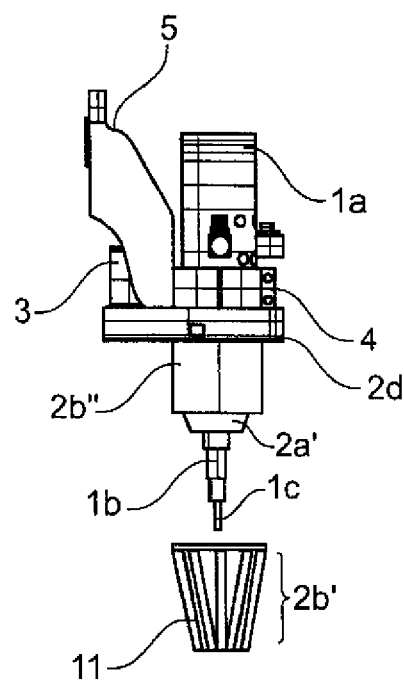
Fig. 5a
Fig. 5b

DEVICE FOR THE EXTRACTION, PARALLEL TO THE PROCESS, OF PROCESSING PRODUCTS ARISING DURING THE PROCESSING OF A WORKPIECE

CROSS-REFERENCES TO RELATED APPLICATIONS

This application is the U.S. National Stage of International Application No. PCT/EP2012/052965, filed Feb. 22, 2012, which designated the United States and has been published as International Publication No. WO 2012/119852 and which claims the priority of German Patent Application, Serial No. 10 2011 013 111.6, filed Mar. 4, 2011, pursuant to 35 U.S.C. 119(a)-(d).

BACKGROUND OF THE INVENTION

The present invention relates to a device for the extraction of processing products arising during the processing of a workpiece by means of a processing device. In particular, it concerns the discharging of processing products which are conveyed in an air- or respectively gaseous flow through a defined flow channel.

From DE4225014C2 an extraction device for welding or cutting installations is known, in which an extraction hood is fastened to the burner or to a burner holder. The extraction hood is connected via extraction tubes to a vacuum generator, in order to extract the flue gases occurring during welding or cutting.

SUMMARY OF THE INVENTION

The invention is based on the problem of being able to reliably discharge processing products arising during the processing of a workpiece also in contour processing operations in the 3-dimensional range. In particular, by the invention the processing products are to be received directly at their point of origin into a suitable flow and can be discharged parallel to the process. The degrees of freedom and the freedom of movement of the directing motion automaton are to be compromised to an extremely small extent, in particular in media-supplied tools.

To solve this problem, an extraction device includes a double-walled extraction hood which has a first inner housing part and a second outer housing part arranged at a distance from the first inner housing part, wherein the two housing parts are arranged coaxial with each other and partially within each other in such a way that an air channel is formed between the two housing parts, wherein the air channel has a front end that can be aligned with the workpiece and a rear end opposite the front end, wherein a flow directed from the front end to the rear end can be created in the air channel, and wherein the extraction hood, in particular the inner housing part of the extraction hood, is designed to accommodate at least part of the processing device and can be connected thereto. Advantageous embodiments and further developments are to be found in the dependent claims.

Through the fact that a double-walled extraction hood is provided, which has a first inner housing part and a second outer housing part arranged at a distance from the first inner housing part, wherein the two housing parts are arranged coaxial with each other and partially within each other in such a way that an air channel is formed between the two housing parts, wherein the air channel has a front end that can be aligned with the workpiece and a rear end opposite the front end, wherein a flow directed from the front end to the rear end can be created in the air channel, and wherein the extraction hood, in particular the inner housing part of the extraction hood, is designed to accommodate at least part of the processing device and can be connected thereto, a targeted air flow can be generated at the point of origin of the processing products. The air, which is accelerated by a pressure difference, is guided within an air channel surrounding the tool. The air channel is designed in an optimized manner with regard to flow and is thereby optimally suited for the transportation of particles in the flow. By avoiding obstacles to the flow or resistances, disadvantageous turbulences or stalls are prevented.

Furthermore, the double-walled embodiment of the extraction hood offers the advantage that almost no processing products impact as accelerated particles onto the tool which is projecting into the flow. This applies in particular when the inner housing part of the extraction hood forms a protective, thin-walled casing which is at least partially placed over the processing device. The fastening of this protective casing, which assumes at the same time the function of the first inner housing part and hence the inner wall of the flow-directing channel, can be integrated into the connection clamping to the motion automaton of the entire processing device. The inner housing part is provided at its end facing the workpiece with an opening or respectively an aperture. This enables the connection from the tool drive to the actual tool holder, which in turn ensures the torque transmission of the drive to the tool itself. A small clearance of this aperture to the tool holder permits a defined exit for sealing air of the pressurization of the drive into the free flow region of the extraction hood and therefore prevents in operation, also without a mechanically closed containment, an entry of particles into the drive housing.

The second outer housing part of the extraction device, i.e. the outer casing of the flow channel, can preferably be likewise produced from a stable flat material. Depending on the case of application, the size of the tool drive, the type of tool or quantity and size of the processing products which are to be discharged, the second outer housing part is arranged at a defined distance from the inner housing part. This means that between the inner and outer wall of the current-directing air channel, a defined distance is formed. By the selection of this distance measurement, the flow cross-section and the volume flow connected therewith and the speed of flow can be varied in a targeted manner. Likewise, the size of the processing products which are able to be conveyed is set by the delimitation of the cross-section.

Advantageously, between the front end of the inner housing part and the front end of the outer housing part a space can be provided to accommodate a front end section of the processing device. Furthermore, advantageously the inner housing part can have a region with an internal diameter which is slightly greater than the external diameter of the inner processing device in this region, so that the inner housing part is constructed in this region for the preferably accurately fitting accommodating of at least part of the processing device, in particular for accommodating and fastening the drive unit. Particularly advantageously, the outer housing part can have a conically tapering front end piece, which is preferably adapted to the contour of the processing device in this region. The tool holder and the tool can be arranged in this region. As a result, the outer housing part therefore extends the flow-directing enclosing of the extraction device up to the area of application of the processing tool, so that the occurring processing products can be received in a targeted manner into a guided defined flow immediately after they occur in the free flow. The structural form of the outer housing part is adapted to the necessary flow cross-sections. It preferably has a smooth surface and a slim geometry. Thereby, the extraction device according to the invention is optimally suited for use on motion automatons.

This novel structural form, which is adapted and to the greatest possible extent integrated to the conditions such as drive unit and tool type, offers the smallest possible interfering contours and therefore enables a maximum utilization of the degrees of freedom and movement possibilities of the motion automaton which is used, in particular in complex three-dimensional contour processing operations. The flow guidance for the transportation of processing products is therefore an integrated component of the processing unit.

At the upper end of the flow channel, the flow enveloping the tool is brought together centrally again and is guided via a flow deflection chamber to a connecting piece. A standardised continuing flow line can be connected to this connecting piece, which continuing flow line is able to be connected in turn for example to a suitable vacuum generator.

In a preferred embodiment, at the lower end of the flow channel a brush attachment or respectively a brush ring is provided as sealing element to the processing product part, which brush attachment or respectively brush ring can be detachably mounted onto the outer wall of the flow channel. This brush serves for the flexible encasing of the immediate processing region. Particles which are accelerated by the processing process are prevented by the bristles, encircling in a ring shape, from leaving the range of influence of the directed air flow and hence of the particle transport flow. Furthermore, this bristle closure enables a mechanical, but flexible sealing contact to the workpiece which is to be processed. Hereby, the flow action is brought into optimum proximity to the point of origin of processing products which are to be conveyed away; a flow saturation already before reaching this position by inflowing foreign media can therefore be as far as possible prevented. In a special variant embodiment, the fibres of the brush can consist of materials which prevent an electrostatic charging of the workpiece which is to be processed in this region or of the bristles themselves. The base body which is used for fixing the bristles can be produced from an elastic material, which makes it possible—depending on the variant embodiment—to embrace the corresponding diameter of the lower end of the flow channel.

According to a further aspect of the present invention, the outer housing part is constructed so as to be detachable from the extraction hood as a whole or in one or more segments, wherein the detachable parts of the outer housing part are movable from a position forming a closed state of the extraction hood into a position forming an opened state of the extraction hood and vice versa. With this possibility, the complete tool holder device of the drive unit can be exposed and an automatic tool change can be carried out by magazine equipment. Furthermore, this offers the possibility, with not necessary conveying away of processing products, to also reach contour regions of the workpiece which is to be processed, which in the closed state of the extraction hood can not be processed or can only be processed with increased effort.

To move the detachable parts, drive means can be provided by which the detachable parts of the outer housing part are movable back and forth parallel to the longitudinal axis of the extraction hood. In a first alternative embodiment, the detachable parts can also be constructed so as to be movable away from the longitudinal axis of the extraction hood. In a further alternative embodiment, the detachable parts can be constructed so as to be pivotable respectively about an axis lying parallel or orthogonal to the longitudinal axis of the extraction hood.

Through this technology with the detachable parts, variants of the outer housing part can be constructed, in particular for the formation of various flow channels with different geometries, brush types or bristle lengths. The detachable parts and, if applicable, matching brush attachments, can be removed fully automatically from a magazine according to the case of application, and assembled to the outer housing part with the desired geometry. The detachable parts of the one variant merely have to be exchanged for detachable parts in another variant. The correct positioning of the detachable parts is monitored by a corresponding sensor system.

In addition to all conventional machining processing operations in CNC machines, machining tasks in robotically guided processes are also to be mentioned as fields of application of this invention. Particularly with the use of industrial robots as flexible guiding motion automatons, in complex contour processing operations the machine-typical movement possibilities are not to be compromised with the use of extraction devices for the elimination of machining waste. This is achieved with the present invention. Furthermore, this invention makes possible, especially in the machining processing of fibre-reinforced plastics, the controlled conveying away from the processing area of dusts which are a health- or explosion hazard.

BRIEF DESCRIPTION OF THE DRAWING

The invention is to be described in further detail below with the aid of example embodiments and with reference to FIGS. 1 to 7b. There are shown:

FIG. 4a side view according to FIG. 2 with extraction hood in closed state and with linear drive means;

FIG. 4b side view according to FIG. 2 with extraction hood in opened state and with linear drive means;

FIG. 5a side view according to FIG. 2 with intake tubes and in closed state of the extraction hood;

FIG. 5b side view according to FIG. 2 with intake tubes and in opened state of the extraction hood;

DETAILED DESCRIPTION OF PREFERRED EMBODIMENTS

Figure 1:
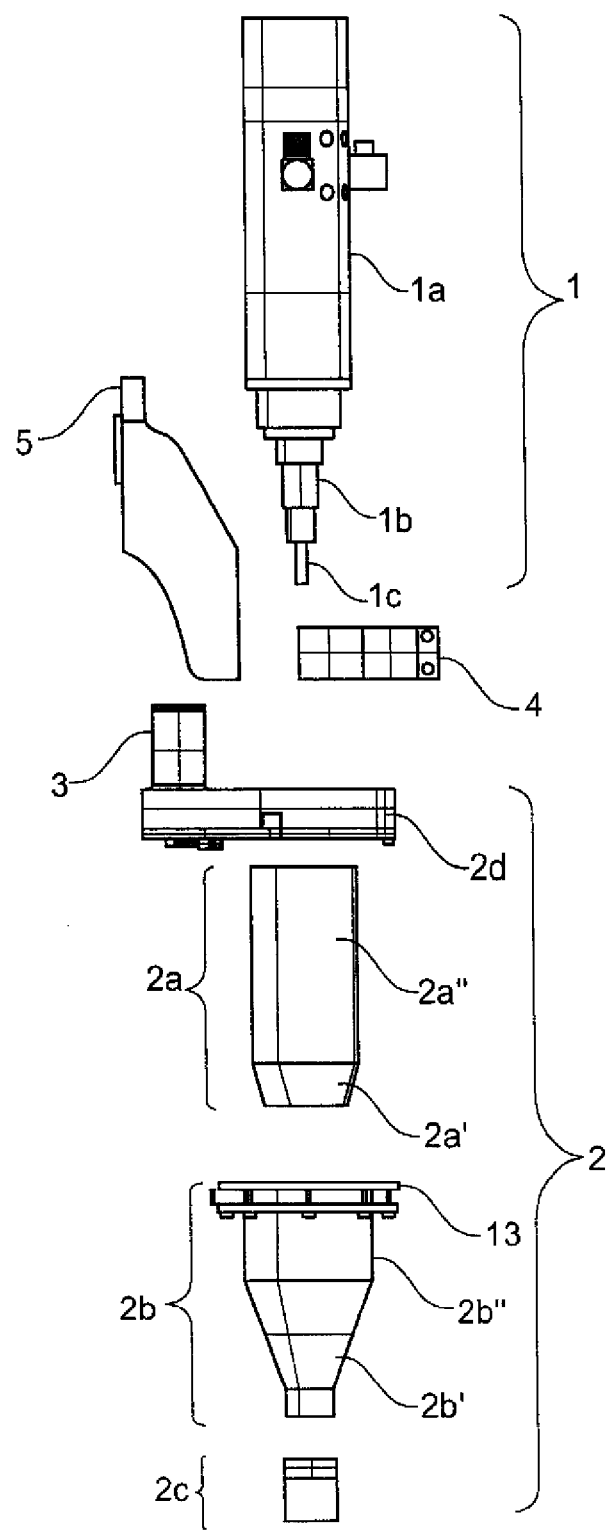
FIG. 1 side view of extraction device and processing device in dismantled state.

FIG. 1 shows a diagrammatic side view of a device for the processing of a workpiece with a workpiece processing device 1, which has a drive unit 1a, a tool holder device 1b and a tool 1c. For example, the workpiece processing device can be a milling device with a milling spindle 1a and a milling tool 1c. The extraction device 2 according to the invention, also referred to in the description as extraction hood, comprises a first, inner housing part 2a and a second, outer housing part 2b. The two housing parts 2a and 2b have respectively a cone-shaped front end piece 2a' or respectively 2b' and cylinder pieces 2a" and 2b" lying therebehind. A brush attachment 2c is provided at the lower end, facing the workpiece in operation. Opposite this end, a flow deflection chamber 2d is provided, having a connecting piece 3 to which a flexible tube can be connected which is able to be connected to a suitable vacuum generator. Furthermore, a clamping ring 4 and a mount 5 can be seen in FIG. 1. By means of the clamping ring 4, the extraction device 2 can be fastened to the drive unit 1a of the workpiece processing device. The mount 5 serves for fastening the unit of workpiece processing device 1 and extraction device 2 to a handling automaton, for example to an arm of an industrial robot.

Figure 2:
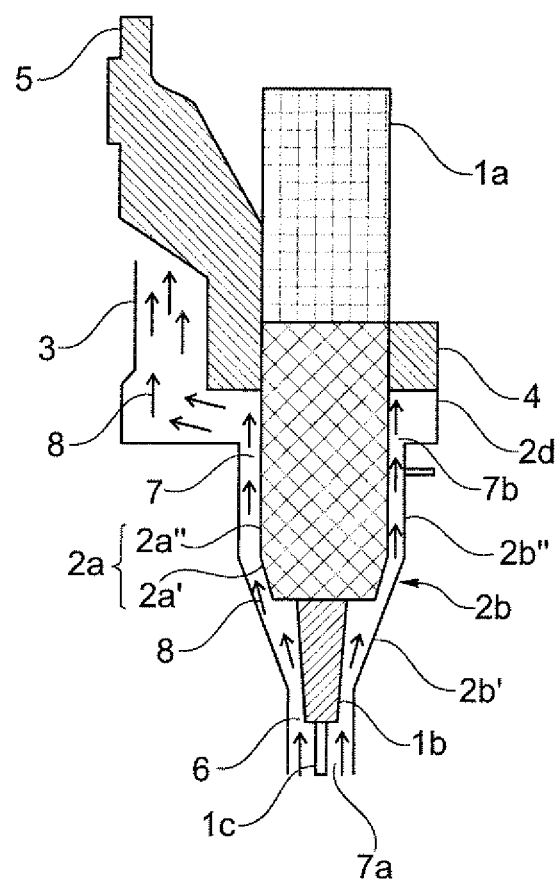
FIG. 2 side view of extraction device and processing device in assembled state.

FIG. 2 shows the arrangement of FIG. 1 in the assembled state and with the assumption that a vacuum generator is connected to the connecting piece 3. In order to be able to identify the individual components better, some of these components are provided with component-specific hatching. The drive unit 1a is accommodated in the inner housing part 2a and is fastened to the drive unit 1a inner housing part 2a by means of the clamping ring 4. The inner housing part 2a extends over the entire front section of the drive unit 1a. The length of the inner housing part 2a and the length and the contour of the end piece 2a' are dimensioned such that the tool holder device 1b projects at least partly out from the inner housing part 2a. The outer housing part 2b is fastened to the underside of the flow deflection chamber 2d, for example by means of a suitable flange 13, and the flow deflection chamber 2d can be connected, in turn, with the clamping ring 4. Between the front end of the inner housing part 2a and the front end of the outer housing part 2b a space 6 is formed for accommodating a front end section of the processing device 1. Here in this space 6 the tool holder device 1b and the tool 1c are accommodated. In this way, an air channel 7 is formed between the outer side of the inner housing part 2a and the inner side of the outer housing part 2b. The air channel 7 has a front end 7a that can be aligned with the workpiece, and a rear end 7b opposite this end. The above-mentioned space 6 therefore forms a segment of the air channel 7. In this air channel 7 a flow is able to be generated, directed from the front end 7a to the rear end 7b, which flow is to be illustrated by the arrows 8. The flow 8 is deflected in the flow deflection chamber 2d in the direction of the connecting piece 3 and is guided into a flexible tube, not illustrated here, which is connected to a vacuum generator, which is likewise not illustrated here. Depending on the configuration of the front end of the extraction hood 2, the front end 7a of the air channel 7 can lie at the front end of the outer housing part 2b or at the front end of the brush attachment 2c. It is merely necessary that at the front end of the extraction hood 2a vacuum is generated and therefore a flow 8 at the front end of the extraction hood 2 entering into the latter, which flow can receive the processing products arising at the processing site. These processing products are then entrained by the flow 8, guided around the tool 1c and the tool holder device 1b and subsequently guided into the annular clearance between the two housing parts 2a and 2b. The inner housing part 2a therefore prevents an impacting or a penetrating of processing products onto or respectively into the remaining components of the processing device 1.

Figure 3A:
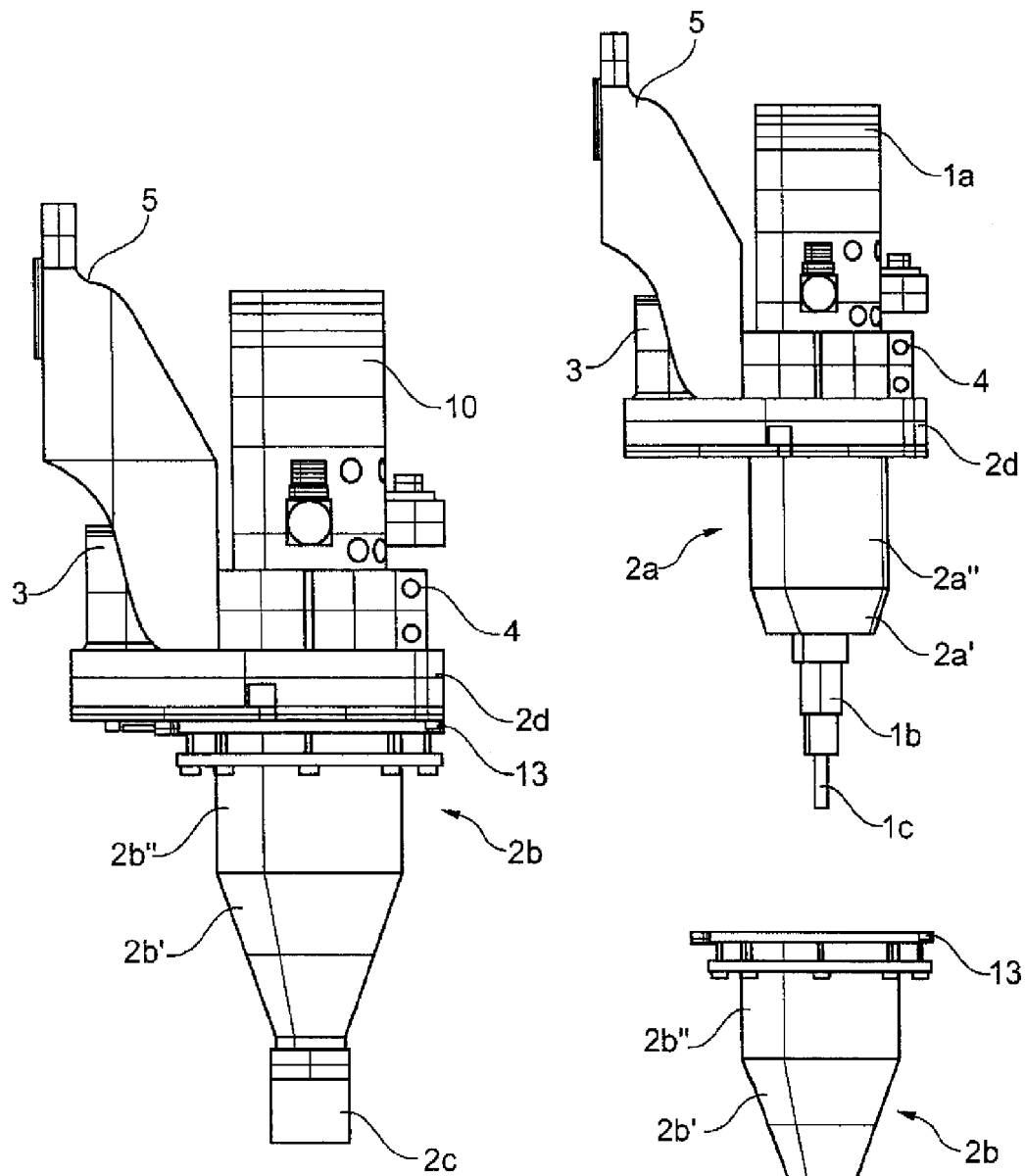
FIG. 3a side view according to FIG. 2 with extraction hood in closed state.
Figure 3B:
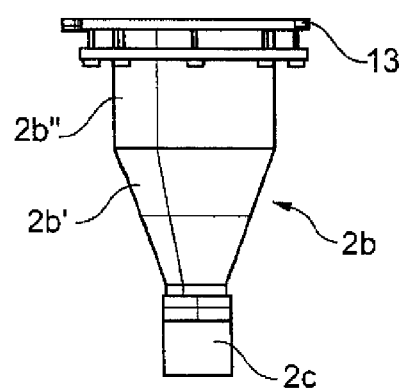
FIG. 3b side view according to FIG. 2 with extraction hood in opened state.

According to a further aspect of the invention, the outer housing part 2b is constructed so as to be detachable as a whole or in one or more segments from the extraction hood 2, wherein the detachable parts of the outer housing part 2b can be brought or respectively are movable from a position forming a closed state of the extraction hood 2 into a position forming an opened state of the extraction hood 2, and vice versa. FIG. 3a shows the arrangement of FIG. 1 in assembled state and in the closed state of the extraction hood 2. FIG. 3b shows a state in which the outer housing part 2b has been detached as a whole from the extraction hood 2, in which the extraction hood 2 is therefore in an opened state. It can be seen from FIG. 3b that in an opened state of the extraction hood 2, the space 6 and the components 1b and 1c of the processing device 1 which are situated there are freely accessible. The outer housing part 2b can be detached by hand or mechanically from the extraction hood 2 and removed. FIGS. 4a and 4b show the use of a linear drive 9, by which for example a rod 10 connected with the outer housing part 2b can be moved parallel to the longitudinal axis of the extraction device 2. FIG. 4a shows the outer housing part 2b in a position which forms the closed state of the extraction hood 2 and FIG. 4b in a position which forms the opened state of the extraction hood 2. As a modification of the example which is shown here, the outer housing part 2b can also be constructed from several parts. For example, the front end piece 2b' and the cylinder piece 2b" lying therebehind can be constructed so as to be detachable from one another. In this case, it can be sufficient if only the front end piece 2b' is removed from the extraction hood 2, in order to expose the space 6 and the components of the processing device 1 which are situated there.

In addition, the front end piece 2b' of the outer housing part 2b does not necessarily have to be constructed as a closed housing. Also, as is illustrated in FIGS. 5a and 5b, individual intake tubes 11 can be joined together to an end piece 2b' and connected with the cylinder piece 2b" lying therebehind, wherein the openings of the intake tubes 11 must be positioned so that the air channel 7, described above, is formed. The housing part 2b can either be removed as a whole from the extraction hood 2 (not illustrated here), or only the front end piece 2b' with the intake tubes 11 is detached from the extraction hood 2, as is shown here. For this, drive means 9, 10, adapted in a suitable manner, can be used, as is described in connection with FIGS. 4a and 4b.

Figure 6A:
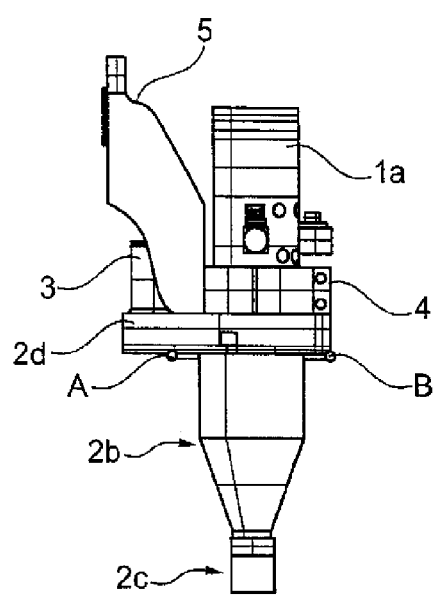
FIG. 6a side view according to FIG. 2 and with a first embodiment of an extraction hood with separable outer housing part in closed state.
Figure 6B:
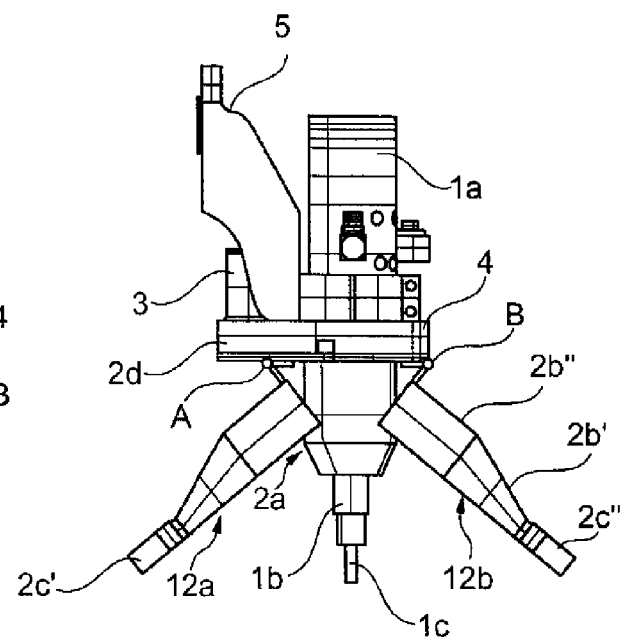
FIG. 6b side view according to FIG. 2 and with a first embodiment of an extraction hood with separable outer housing part in opened state.
Figure 7A:
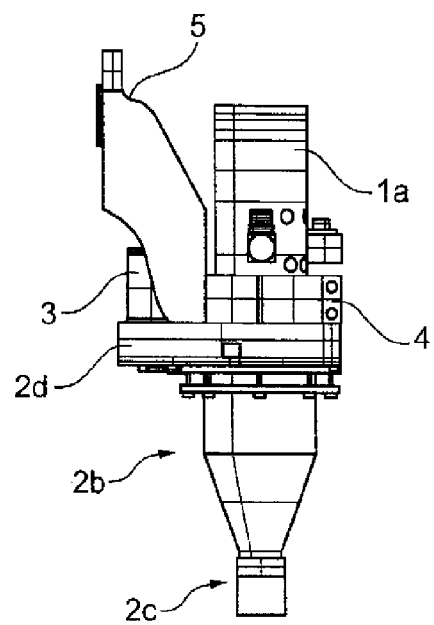
FIG. 7a side view according to FIG. 2 and with a second embodiment of an extraction hood with separable outer housing part in closed state.
Figure 7B:
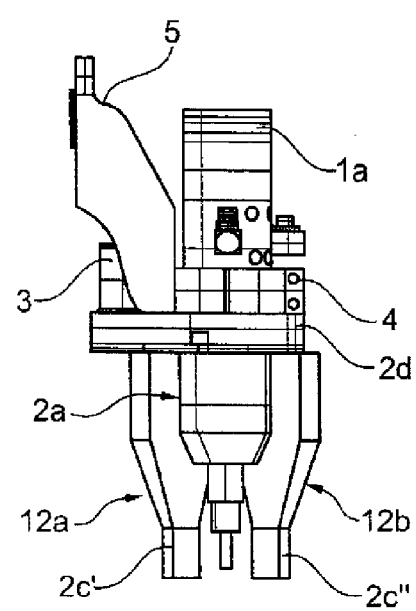
FIG. 7b side view according to FIG. 2 and with a second embodiment of an extraction hood with separable outer housing part in opened state.

According to a further configuration, the detachable parts of the outer housing part 2b can be pivotable respectively about an axis lying parallel or orthogonal to the longitudinal axis of the extraction hood 2. These embodiments are illustrated in FIGS. 6a/6b and 7a/7b. Both the outer housing part 2b and also the brush attachment 2c are embodied in two parts, so that two half shells 12a and 12b are formed. According to the example embodiment of FIGS. 6a and 6b, the two half shells 12a and 12b are mounted articulatedly on axes A and B, which lie orthogonally to the longitudinal axis of the extraction device 2. By a pivoting movement about the axes A and B, the two half shells 12a and 12b can be moved out from the position shown in FIG. 6a into the position shown in FIG. 6b, and back. According to the example embodiment of FIGS. 7a and 7b, the two half shells 12a and 12b are mounted articulately on an axis C, which lies parallel to the longitudinal axis of the extraction hood. In the figures, this axis C lies precisely behind the longitudinal axis of the extraction hood 2. By a pivoting movement about the axis C, the half shells 12a and 12b can be moved out from the position shown in FIG. 7a into the position shown in FIG. 7b, and back. By the previously described pivoting movements, the detachable parts 12a and 12b of the outer housing part 2b (here with 2c) can be brought from a position forming a closed state of the extraction hood 2 (FIG. 6a or respectively FIG. 7a) into a position forming an opened state of the extraction hood 2 (FIG. 6b or respectively 7b) and vice versa.

LIST OF REFERENCE NUMBERS 1 processing device
1a drive unit
1b tool holder device
1c tool
2 extraction device
2a inner housing part
2a' conical end piece
2b outer housing part
2b' conical end piece
2b" cylinder piece
2c brush attachment
2c', 2c" parts with divided brush attachment 2c
2d flow deflection chamber
3 connecting piece
4 clamping ring
5 mount
6 space for accommodating a front end section of the processing device 1
7 air channel
7a front end of the air channel
7b rear end of the air channel
8 flow
9 linear drive
10 rod
11 intake tubes
12a first half shell
12b second half shell
13 fastening flange
A, B, C pivot axes

What is claimed is:

1. A device for the extraction of a processing product during processing of a workpiece, comprising a double-walled extraction hood having a first inner housing part and a second outer housing part which is arranged at a distance from the first inner housing part, said first and second housing parts having an axis and are arranged in coaxial relationship one within the other to thereby form an air channel between the first and second housing parts, said air channel having a front end, which is adapted for alignment with the workpiece, and a rear end, which is arranged opposite to the front end and communicates with a deflection chamber that is connectable with a vacuum generator and is formed circumferentially around the first inner housing part with a width that is greater than a width of the second outer housing part, said air channel provided to direct a flow from the front end to the rear end, said extraction hood accommodating at least part of a processing device for processing the workpiece and being connectable thereto, wherein said deflection chamber has an uninterrupted circumferential wall bounding a smaller space at one radial side and a larger space at another opposite radial side, an axial circumferential inlet communicating with the rear end of the air channel and a straight axial outlet extending from the larger space of the deflection chamber parallel to the axis of the first and second housing parts and guiding a flow out of the deflection chamber in an axial direction.

2. The device of claim 1, wherein the inner housing part of the extraction hood accommodates at least the part of the processing device and is connectable thereto.

3. The device of claim 1, wherein the first and second housing parts define an inner housing part and an outer housing part, each having a front end to define therebetween a space to accommodate a front end section of the processing device.

4. The device of claim 1, wherein the first and second housing parts define an inner housing part and an outer housing part, said inner housing part having a region defined by an internal diameter which is slightly greater than an external diameter of the processing device in an area of the region, said region of the inner housing part accommodating of at least the part of the processing device.

5. The device of claim 4, wherein the region of the inner housing part is constructed for receiving at least the part of the processing device by a precision fit.

6. The device of claim 1, wherein the first and second housing parts define an inner housing part and an outer housing part, said outer housing part having a conically tapering front end piece to complement a contour of the processing device in the region.

7. The device of claim 1, wherein the first and second housing parts define an inner housing part and an outer housing part, said outer housing part having a multipart configuration with several segments of which at least a first plurality of segments is detachable from the inner housing part and movable from a position forming a closed state of the extraction hood into a position forming an opened state of the extraction hood, and vice versa.

8. The device of claim 7, wherein the outer housing part as a whole is detachable form the inner housing part.

9. The device of claim 7, further comprising a drive capable of moving the first plurality of segments of the outer housing part back in a linear movement with respect to the extraction hood.

10. The device of claim 7, wherein the first plurality of segments is movable away from a longitudinal axis of the extraction hood.

11. The device of claim 7, wherein the first plurality of segments is pivotable about an axis which extends in parallel or orthogonal relation to a longitudinal axis of the extraction hood.

12. The device of claim 1, wherein the outer housing part has a front end, and further comprising a brush attachment provided connected to the front end of the outer housing part.

13. The device of claim 12, wherein the brush attachment is of multipart construction.

14. The device of claim 1, wherein at least one of the first and second housing parts is constructed rotation-symmetrically with respect to a longitudinal axis of the extraction hood.

15. The device of claim 1, wherein the processing device has a drive unit, a tool holder device, and a tool insertable in the tool holder device and operably connected to the drive unit.

16. The device of claim 15, wherein the drive unit is constructed for generating a rotary movement of the tool.

17. The device of claim 15, wherein the tool is a machining tool.

18. The device of claim 17, wherein the machining tool is a milling spindle.

19. The device of claim 15, wherein the first and second housing parts define an inner housing part and an outer housing part, each having a front end to define there between a space for receiving the tool.

20. The device of claim 15, wherein the first and second housing parts define an inner housing part and an outer housing part, each having a front end to define there between a space for receiving at least part of the tool holder device.

21. The device of claim 20, wherein the drive unit is connected in a substantially airtight manner with a cylinder piece of the inner housing part.

22. A device for the extraction of a processing product during processing of a workpiece, comprising a double-walled extraction hood having a first inner housing part and a second outer housing part which is arranged at a distance from the first inner housing part, said first and second housing parts having an axis and are arranged in coaxial relationship one within the other to thereby form an air channel between the first and second housing parts, said air channel having a front end, which is adapted for alignment with the workpiece, and a rear end, which is arranged opposite to the front end, said air channel provided to direct a flow from the front end to the rear end, said extraction hood accommodating at least part of a processing device for processing the workpiece and being connectable thereto, wherein the first and second housing parts define an inner housing part and an outer housing part, and wherein the outer housing part is composed of a plurality of individual intake tubes which are joined together and form an inlet channel, and a deflection chamber which has an uninterrupted circumferential wall, an axial inlet communicating with the rear end of the air channel and an axial outlet guiding a flow out of the deflection chamber in an axial direction, wherein said deflection chamber has an uninterrupted circumferential wall bounding a smaller space at one radial side and a larger space at another opposite radial side, an axial circumferential inlet communicating with the rear end of the air channel and a straight axial outlet extending from the larger space of the deflection chamber parallel to the axis of the first and second housing parts and guiding a flow out of the deflection chamber in an axial direction.

23. A device for the extraction of a processing product during processing of a workpiece, comprising a double-walled extraction hood having a first inner housing part and a second outer housing part which is arranged at a distance from the first inner housing part, said first and second housing parts having an axis and are arranged in coaxial relationship one within other to thereby form an air channel between the first and second housing parts, said air channel having a front end, which is adapted for alignment with the workpiece, and a rear end, which is arranged opposite to the front end, said air channel provided to direct a flow from the front end to the rear end, said extraction hood accommodating at least part of a processing device for processing the workpiece and being connectable thereto, wherein the first and second housing parts define an inner housing part and an outer housing part, and wherein the outer housing part has a plurality of segments pivotable about an axis which is parallel or orthogonal to a longitudinal axis of the extraction hood, and a deflection chamber which has an uninterrupted circumferential wall, an axial inlet communicating with the rear end of the air channel and an axial outlet guiding a flow out of the deflection chamber in an axial direction, wherein said deflection chamber has an uninterrupted circumferential wall bounding a smaller space at one radial side and a larger space at another opposite radial side, an axial circumferential inlet communicating with the rear end of the air channel and a straight axial outlet extending from the larger space of the deflection chamber parallel to the axis of the first and second housing parts and guiding a flow out of the deflection chamber in an axial direction.

24. The device of claim 22, wherein the processing device has a drive unit, a tool holder device, and a tool insertable in the tool holder device and operably connected to the drive unit.

25. The device of claim 23, wherein the processing device has a drive unit, a tool holder device, and a tool insertable in the tool holder device and operably connected to the drive unit.

26. A device for the extraction of a processing product during processing of a workpiece, comprising a double-walled extraction hood having a first inner housing part and a second outer housing part which is arranged at a distance from the first inner housing part, said first and second housing parts having an axis and are arranged in coaxial relationship one within the other to thereby form an air channel between the first and second housing parts, said air channel having a front end, which is adapted for alignment with the workpiece, and a rear end, which is arranged opposite to the front end, said air channel provided to direct a flow from the front end to the rear end, said extraction hood accommodating at least part of a processing device for processing the workpiece and being connectable thereto, wherein the first and second housing parts define an inner housing part and an outer housing part, and wherein the outer housing part has a plurality of segments pivotable about an axis which is orthogonal to a longitudinal axis of the extraction hood, and a deflection chamber having an uninterrupted circumferential wall bounding a smaller space at one radial side and a larger space at another opposite radial side, an axial circumferential inlet communicating with the rear end of the air channel and a straight axial outlet extending from the larger space of the deflection chamber parallel to the axis of the first and second housing parts and guiding a flow out of the deflection chamber in an axial direction.

\* \* \* \* \*